Oct. 9, 1951     A. Y. DODGE     2,570,327
TRANSMISSION
Filed April 6, 1946     2 Sheets-Sheet 1
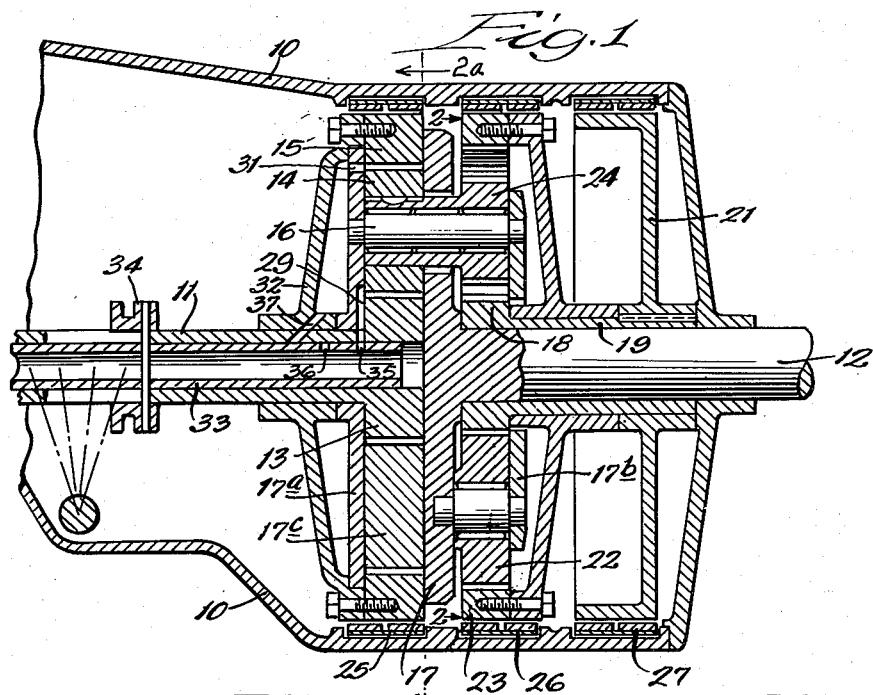
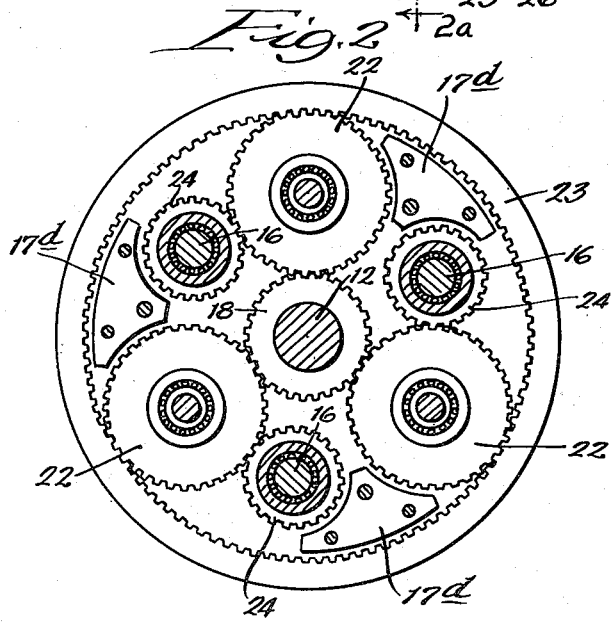
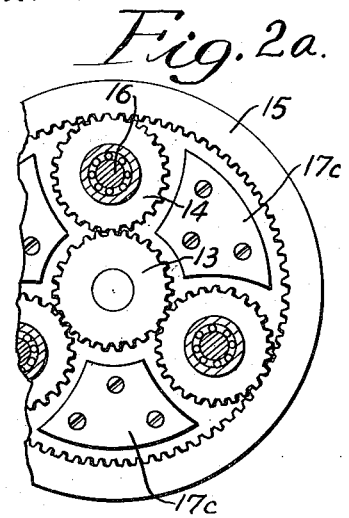
Inventor:
Adiel Y. Dodge,
By Dawson, Booth and Spangenberg,
Attorneys.

Oct. 9, 1951
A. Y. DODGE
2,570,327
TRANSMISSION
Filed April 6, 1946
2 Sheets-Sheet 2
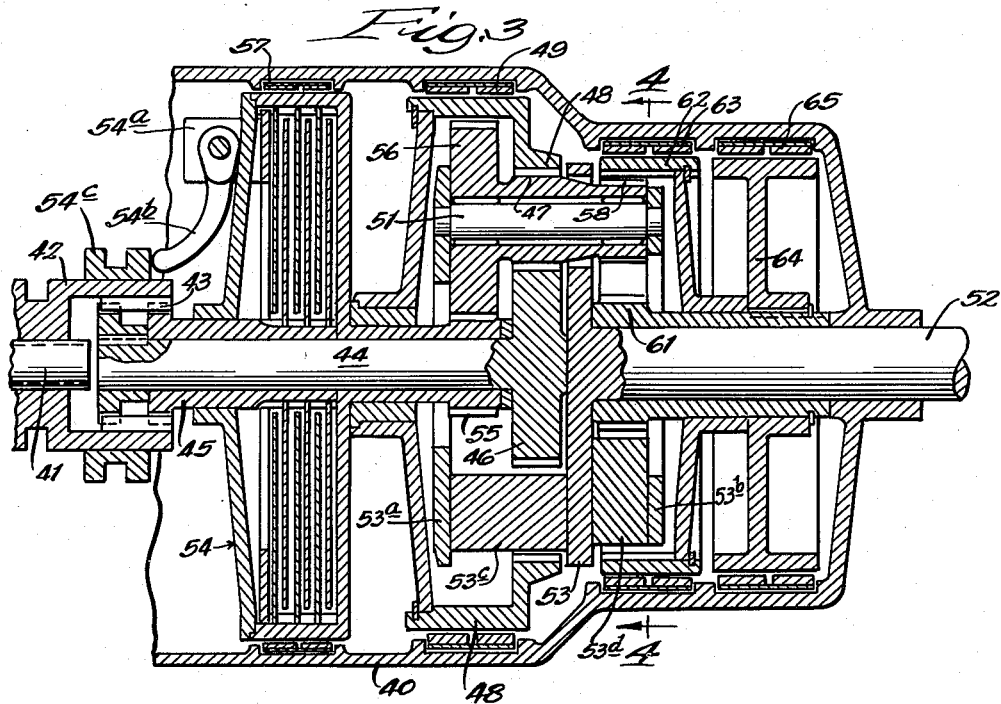
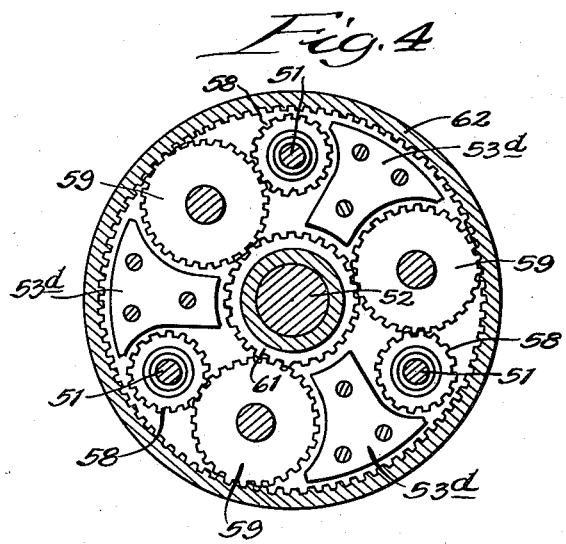
Inventor:
Adiel Y. Dodge,
By Dawson, Booth & Faugenberg,
Attorneys.

Patented Oct. 9, 1951

2,570,327

UNITED STATES PATENT OFFICE 2,570,327

TRANSMISSION

Adiel Y. Dodge, Rockford, Ill.

Application April 6, 1946, Serial No. 660,232

7 Claims. (Cl. 74—761)

This invention relates to transmissions and more particularly to multiple speed gear transmissions of the type suitable for use in automotive vehicles.

One of the objects of the invention is to provide a planetary gear transmission which is extremely simple and inexpensive and in which the control parts such as clutches and brakes are ready accessible to mechanical actuation.

Another object is to provide a transmission which will produce a plurality of ratios and which may be simply and easily shifted from one ratio to the other while under full load.

Still another object is to provide a transmission in which the necessity for a master clutch is eliminated so that all controls can be obtained by simple friction brakes or clutches contained in the transmission housing. According to one feature of the invention, the brake or clutch controls can easily be arranged for manual, semi-automatic or full automatic operation.

A further object is to provide a planetary transmission in which the driving and driven shafts may be permanently connected to transmission elements for all speed ratios and in which the parts are so arranged that desirable ratios can be produced.

A still further object is to provide a transmission in which power flow is through a relatively small number of gears in all ratios.

The above and other objects and advantages of the invention will be more readily apparent from the following description when read in connection with the accompanying drawing, in which:

Figure 1 is a diagrammatic sectional view of a transmission embodying the invention;

Figure 2 is a section on the line 2—2 of Figure 1 with parts in elevation;

Figure 2a is a section on the line 2a—2a of Figure 1 with parts in elevation.

Figure 3 is a view similar to Figure 1 of an alternative construction; and

Figure 4 is a section on the line 4—4 of Figure 3.

The transmission shown in Figures 1 and 2 is designed to provide three forward ranges and one reverse range suitable for automotive use. As shown, the entire transmission mechanism is mounted in a housing 10 which replaces the conventional automotive transmission housing. A tubular drive shaft 11 which may be an extension of the usual engine crank shaft extends into the forward end of the housing, and a driven shaft 12 which may connect to the vehicle wheels through the usual differential mechanism extends from the opposite end of the housing.

The transmission proper comprises essentially a complex planetary gear set including a sun gear 13 permanently connected to the driving shaft 11 and meshing with planet pinions 14 which in turn mesh with a ring gear 15. The planet pinions 14 are journaled on shafts 16 which are rotatably supported in a planet cage permanently secured to the driven shaft 12. The planet cage is formed by a central disc 17 permanently secured to the driven shaft and side discs 17a and 17b held spaced from the central discs by spacer blocks 17c and 17d. The discs may be secured together into a rigid assembly by bolts or the like extending through the discs and spacer blocks and the shafts 16 may be mounted in the side discs, as shown.

A second sun gear 18 is mounted on a sleeve 19 which is rotatable on the driven shaft 12 and which carries a brake drum 21. The sun gear 18 meshes with a set of idler pinions 22 rotatably mounted on shafts supported by the discs 17 and 17b and which in turn mesh with a ring gear 23. Small planet pinions 24 mesh with the idler pinions 22, as best seen in Figure 2, and are formed with elongated hubs connected to the pinions 14 and journaled on the shafts 16. Control of the transmission as so far described is effected through friction brakes 25, 26, and 27 which engage respectively the ring gear 15, the ring gear 23 and the brake drum 21.

With the transmission mechanism as so far described when all of the brakes are released, the parts can rotate freely so that no torque will be transmitted from the driving shaft to the driven shaft. For low gear operation the brake 25 is engaged with the ring gear 15 to hold it stationary, the other brakes remaining disengaged. At this time forward rotation of the sun gear 13 will drive the planet carrier forward at reduced speed and increased torque. For higher speed drive the brake 26 may be released and the brake 27 engaged to hold the sun gear 18 against rotation. At this time forward rotation of the sun gear 13 will turn the planet pinions 14 which in turn will turn the planet pinions 24. The pinions 24 will cause the idler pinions 22 to rotate so that they will revolve around the fixed sun gear 18 to turn the carrier forward.

If we assume a diameter of the sun gear 13 of 2", of the pinions 14 of 1.75", and of the ring gear 15 of 5.5", the ratio in the low gear position, as described above, will be 3.75:1. If at the same time the pinions 24 are made of a diameter of 1.33", the pinions 22 of 2.17", the sun gear 18 of 1.66" and the ring gear 23 of 6", the ratio in the second gear position above described will be 2.09:1. With a conventional rear axle having a ratio of 3.33:1, the overall low gear ratio will be 12.5:1, and the second gear ratio will be 6.95:1 which provide very satisfactory ratios for low gear and second gear operation in an automotive vehicle.

Reverse drive is obtained by engaging the brake 26 and disengaging the brakes 25 and 27. The operation at this time is similar to that for second gear drive except that instead of rolling around on the sun gear 18 the pinions 22 roll around the ring gear 23 to turn the gear carrier in a reverse direction. With the gear sizes as indicated above, the reverse ratio through the transmission is 2.94:1 and the over-all reverse ratio is 9.8:1.

For direct drive forward means are provided to lock the gear elements against relative rotation so that the entire gear assembly turns as a unit. As shown, this is effected hydraulically in the manner more particularly described and claimed in my Patents Nos. 2,371,228 or 2,371,299. To this end the ends of the teeth of the sun gear 13, pinions 14 and ring gear 15 are closed by plates 17 and 17a, and the spacer blocks 17c are shaped to fit closely against the tips of the teeth so that the gear set will constitute a pump. Fluid may be supplied to the pump through the hollow drive shaft 11 and through one or more inlet ports 29 communicating with the spaces adjacent the points of mesh of the teeth, as more fully explained in my patents. Fluid may be discharged from the pump through ports 31 communicating with a space between the side plates 17a and a skirt 32 carried by the ring gear 15. To control the inlet and discharge of fluid a tubular valve 33 is slidably mounted in the tubular drive shaft 11 and may be shifted through a collar 34 having a pin extending through slots in the drive shaft. The valve 33 is formed with an inlet passage 35 adapted to register through ports in the driving shaft 11, with the inlet passages 29 and with a discharge passage 36 adapted to register through discharge ports 37 in the skirt 32, and the driving shaft 11 with the discharge space between the skirt 32 and the side plate 17a. With the valve 33 in the position shown fluid such as oil will be supplied through the tubular valve from any desired source to the inlet passages of the pump, but the discharge ports 37 will be closed so that no fluid can flow from the pump. At this time, therefore, pressure of the fluid in the pump will hold the gears 13, 14 and 15 against relative rotation so that the entire gear set will turn as a unit to provide direct drive. When the valve 33 is shifted to the left to bring the passage 36 into register with the port 37 fluid may be discharged from the pump so that the gears can turn freely and function as an ordinary planet gear set.

Figure 4 illustrates an alternative construction for providing four forward speeds plus reverse. As shown, the mechanism is mounted in a housing 40 which may replace the usual automotive transmission housing. The driving shaft such as the engine crank shaft shown at 41 has a clutch collar 42 slidably splined thereto. Elongated clutch teeth 43 on the interior of the collar 42 are adapted to engage either or both of the complementary clutch teeth carried by an intermediate shaft 44 and a sleeve 45 around the shaft 44. The shaft 44 carries a sun gear 46 which meshes with planet pinions 47 which in turn mesh with a ring gear 48. The ring gear 48 is adapted to be held stationary when desired by a brake 49. The pinions 47 are journaled on shafts 51 which are carried by a gear carrier permanently connected to the driven shaft 52. The carrier is similar to that of Figure 1 and is formed by a center plate 53 permanently connected to the driven shaft and rigidly connected to side plates 53a and 53b through spacer blocks 53c and 53d.

The sleeve 45 is connected to one part of a friction clutch indicated generally at 54, the other part of which is connected to a sun gear 55. The clutch 54 is urged to engaged position by spring plungers 54a and may be released by throw-out levers 54b operated by a collar 54c. Pinions 56 rigidly secured to the pinions 47 mesh with the sun gear 55. A brake 57 is adapted to engage the outer clutch member which is connected to the sun gear 55 to hold this gear stationary, when desired.

The shafts 51 also carry planet pinions 58 which, as best seen in Figure 4, mesh with idler pinions 59. The idler pinions 59 mesh with a sun gear 61 rotatable around the driven shaft 52 and with a ring gear 62 which may be held stationary when desired by a brake 63. The sun gear 61 is connected to a brake drum 64 which is adapted to be engaged by a friction brake 65.

For low gear drive the clutch collar 42 is shifted to connect the driving shaft 41 to the intermediate shaft 44 to drive the sun gear 46. The collar 42 may occupy the position shown in which it connects the driving shaft to both shafts 44 and 45 and may remain in this position for all driving ratios with the exception of the second reverse ratio as described hereinafter. With the brake 49 engaged to hold the ring gear 48 stationary the sun gear 46 will cause the planet pinions 47 to ride around the ring gear and drive the planet carrier and driven shaft forward at reduced speed. With the sun gear 46 of a diameter of 3", the pinions 47 of 1½", and the ring gear 48 of 6", the transmission ratio at this time will be 3:1. With a conventional rear axle having a 4:1 ratio the over-all ratio will be 12:1 which is very satisfactory for low gear drive.

For second gear the brake 65 may be engaged to hold the sun gear 61 stationary. At this time the idler pinions 59 will be turned through the pinions 58 and 47 and the sun gear 46 to roll around the sun gear 61 and drive the carrier and driven shaft forward. With the sun gear 61 2" in diameter, the pinions 58 1.33", the idler pinions 59 2", and the ring gear 62 6", this will produce a transmission ratio of 1.75:1 or an over-all ratio of 7:1.

For direct drive the clutch 54 may be engaged to connect the sun gear 55 to the driving shaft, the sun gear 46 remaining connected to the driving shaft. In this position the gear elements are locked against relative rotation so that the entire assembly will turn as a unit. To produce over drive the brake 57 may be engaged to hold the sun gear 55 stationary, the clutch 54 being disengaged. At this time the sun gear 46 will rotate the planet pinions 47 and 56 and the latter will roll around the relatively small sun gear 55 to drive the carrier forward. If the diameter of the sun gear 55 is 1.5" and of the pinions 56 is 3", this will produce an over drive ratio of .75:1, producing an over-all ratio of 3:1 with a 4:1 rear axle.

For reverse the brake 63 is engaged to hold the ring gear 62 stationary. With the clutch 54 disengaged and the clutch collar 42 in the position shown, the sun gear 46 will rotate the planet pinions 47 which in turn will rotate the pinions 58 and the idler pinions 59. The idler pinions 59 will revolve around the stationary ring gear 62 to drive the carrier and driven shaft in a reverse direction. A lower ratio reverse may be obtained by shifting the clutch collar 42 to the right to connect the driving shaft with the shaft 45 only and engaging the clutch 54 while retaining the brake 62 engaged. At this time the relatively small sun gear 55 will turn the larger pinions 56 at a relatively low speed so that the idler pinions 59 will turn at a lower speed to drive the carrier and the driven shaft rearwardly at lower speed. With this arrangement two reverse ratios are possible.

It will be seen that with both embodiments of the invention shown a plurality of highly desirable ratios are obtained simply and easily merely through engagement and disengagement of friction brakes and clutches which can be operated under full load conditions. It will also be noted that all of these ratios are obtained with a relatively small number of gears and that in each instance the power is transmitted through only a few gears so that high efficiency is obtained.

While two embodiments of the invention have been shown and described in detail herein, it will be understood that they are illustrative only and are not intended as a definition of the scope of the invention, reference being had for that purpose to the appended claims.

What is claimed is:

1. A transmission for connecting driving and driven shafts comprising a compound planetary gear set having a pair of sun gears, a pair of ring gears, a gear carrier, a pinion on the carrier meshing with one of the sun gears and one of the ring gears, a second pinion on the carrier connected to the first named pinion, and an idler pinion meshing with the other sun and ring gears and with the second pinion, means for connecting the carrier and one of the sun gears to the shafts, brake means for selectively braking the other sun gear and the ring gears, means inclosing one of the sun gears and its corresponding ring gear and pinions to form a gear pump, and a valve controlling inlet and discharge of fluid to the gear pump.

2. A transmission for connecting driving and driven shafts comprising a componud planetary gear set having a pair of sun gears, a pair of ring gears, a gear carrier, a pinion on the carrier meshing with one of the sun gears and one of the ring gears, a second pinion on the carrier connected to the first named pinion, and an idler pinion meshing with the other sun and ring gears and with the second pinion, the carrier and one of the sun gears being connected to the shafts, brake means for selectively braking the other sun gear and the ring gears, means inclosing the teeth of said one of the sun gears and its corresponding ring gear and pinions to form a gear pump, the shaft to which said one of the sun gears is connected being hollow to provide for inlet of fluid to and discharge of fluid from the pump, and a valve slidable in the hollow shaft to control inlet of fluid to and discharge of fluid from the pump.

3. A transmission for connecting driving and driven shafts comprising a compound planetary gear set having two ring gears, three sun gears, a planet carrier, a set of three interconnected planet pinions on the carrier, one meshing with one of the sun gears and one of the ring gears, and another meshing with a second of the sun gears, and an idler pinion meshing with the other ring gear, the third sun gear and the third planet pinion, the carrier and said one of the sun gears being connected to the shafts, clutch means for connecting said one of the sun gears and said second sun gear, and brake means for selectively holding the ring gears and the second and third sun gears.

4. A transmission for connecting driving and driven shafts comprising a compound planetary gear set having two ring gears, three sun gears, a planet carrier, a set of three interconnected planet pinions on the carrier, one meshing with one of the sun gears and one of the ring gears, and another meshing with a second of the sun gears, and an idler pinion meshing with the other ring gear, the third sun gear and the third planet pinion, the carrier and said one of the sun gears being connected to the shafts, controllable means to disconnect said one of the sun gears from its shaft and to connect said second sun gear thereto, and brake means for selectively holding the ring gears and the second and third sun gears.

5. A transmission for connecting driving and driven shafts comprising a compound planetary gear set having a pair of sun gears, a ring gear, a gear carrier, a pinion on the carrier meshing with one of the sun gears and the ring gear, a second pinion on the carrier connected to the first named pinion and extending into the plane of the other sun gear but of a size to be out of mesh therewith, an idler pinion meshing with the other sun gear and with the second pinion, the carrier and one of the sun gears being connected to the shafts, brake means for selectively braking the other sun gear to provide a reduced speed drive and the ring gear to produce a reverse drive, and means to connect the ring gear and its corresponding sun gear and pinions against relative rotation to provide direct drive.

6. A transmission for connecting driving and driven shafts comprising a compound planetary gear set having first, second and third sun gears, a ring gear coplanar with the first sun gear, a gear carrier, a compound pinion on the gear carrier having one portion meshing with the first sun gear and the ring gear, a second portion meshing with the second sun gear, and a third portion extending into the plane of the third sun gear but of a size to be out of mesh therewith, an idler pinion on the carrier meshing with the third portion and the third sun gear, the carrier being connected to the driven shaft, brake means for selectively holding the second and third sun gears and the ring gear against rotation, and means for selectively connecting the first and second sun gears to the driving shaft.

7. A transmission for connecting driving and driven shafts comprising a compound planetary gear set having a pair of sun gears, a ring gear member, and a planet carrier member, compound planet pinions on the carrier member having portions meshing with the sun gears respectively and a portion meshing with the ring gear, controllable clutch means to connect the sun gears selectively or simultaneously to the driving shaft and including a friction clutch having one part connected to one of the sun gears, a brake engageable with said clutch part to hold said one of the sun gears stationary to produce one driving condition, one of said members being connected to the driven shaft and a brake to hold the other of the members to produce a different driving condition, both of the brakes being disengaged and both of the sun gears being connected to the driving shaft by the clutch means to provide direct drive.

ADIEL Y. DODGE.

REFERENCES CITED

The following references are of record in the file of this patent:

UNITED STATES PATENTS

| Number | Name | Date |
|---|---|---|
| 593,652 | Hardingham | Nov. 16, 1897 |
| 694,197 | Rose | Feb. 25, 1902 |
| 1,217,059 | Pollard | Feb. 20, 1917 |
| 1,256,373 | Rowledge | Feb. 12, 1918 |
| 1,307,230 | Zweigbergk | June 17, 1919 |
| 1,395,668 | Drill | Nov. 1, 1921 |
| 1,993,988 | Barrett | Mar. 12, 1935 |
| 2,194,954 | Ravigneaux | Mar. 26, 1940 |
| 2,371,228 | Dodge | Mar. 13, 1945 |
| 2,372,817 | Dodge | Apr. 3, 1945 |

FOREIGN PATENTS

| Number | Country | Date |
|---|---|---|
| 20,861 | Great Britain | Aug. 28, 1904 |
| 328,472 | France | July 11, 1903 |